United States Patent
Dovek et al.

(10) Patent No.: US 6,172,832 B1
(45) Date of Patent: *Jan. 9, 2001

(54) DATA STORAGE SYSTEM WITH IMPROVED BIASING TECHNIQUES FOR MAGNETO-RESISTIVE ELEMENT

(75) Inventors: Moris M. Dovek; Gang Herbert Lin; Erhard T. Schreck, all of San Jose, CA (US)

(73) Assignee: Maxtor Corporation, Longmont, CO (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/432,919

(22) Filed: Nov. 2, 1999

Related U.S. Application Data

(63) Continuation of application No. 09/016,551, filed on Jan. 30, 1998, now Pat. No. 6,104,563.

(51) Int. Cl.[7] ............................. G11B 5/03; G11B 5/09; G11B 5/02
(52) U.S. Cl. .................................. 360/66; 360/53; 360/67
(58) Field of Search .................................. 360/66, 46, 53

(56) References Cited

U.S. PATENT DOCUMENTS

| | | | |
|---|---|---|---|
| 3,979,775 | 9/1976 | Schwarz | 360/113 |
| 4,703,378 | 10/1987 | Imakoshi et al. | 360/113 |
| 5,260,836 | 11/1993 | Yada et al. | 360/63 |
| 5,309,295 | 5/1994 | Bailey et al. | 360/66 |
| 5,436,773 | 7/1995 | Hanson | 360/66 |
| 5,461,517 | 10/1995 | Suda et al. | 360/66 |

*Primary Examiner*—W. Chris Kim
(74) *Attorney, Agent, or Firm*—David M. Sigmond

(57) ABSTRACT

A magnetic storage system capable of separating thermal signals from data signals is disclosed. The magnetic storage system includes a magnetic media and a head associated with the magnetic media. The head includes a magneto-resistive element which is biased by a modulated bias current. The modulated bias current modulates thermal signals to a first frequency and modulates data signals to at least a second frequency. A method of separating thermal signals from data signals read from a magnetic storage media is also disclosed. The method includes the steps of (1) providing a head for reading information from the magnetic storage media, the head having an MR element; and, (2) biasing the MR element with a modulated bias current.

60 Claims, 6 Drawing Sheets

Ha+
R increases
IR=V=> increases

Ha−
R decreases
IR=V=> decreases

Ha+
R decreases
IR=V=> increases

Ha−
R increases
IR=V=> decreases

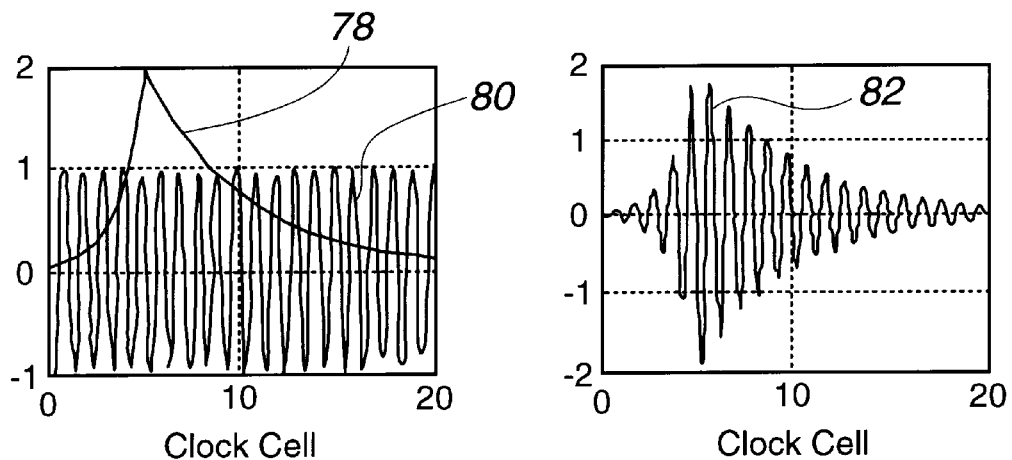
Fig. 8a  Fig. 8b
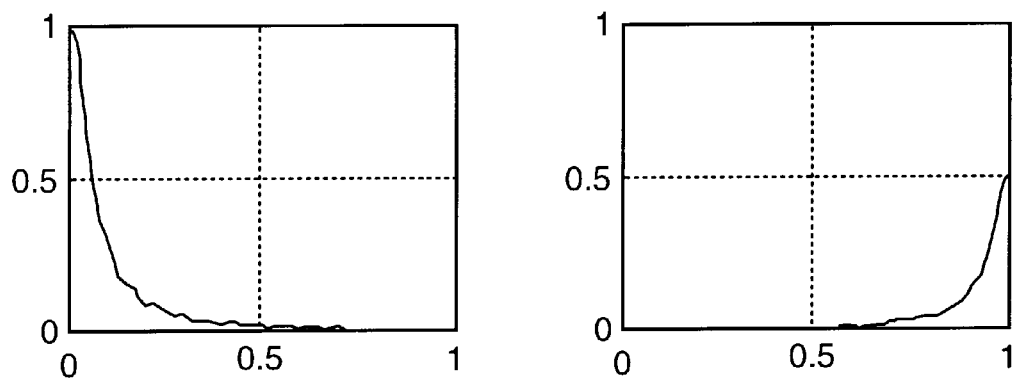
Fig. 8c  Fig. 8d

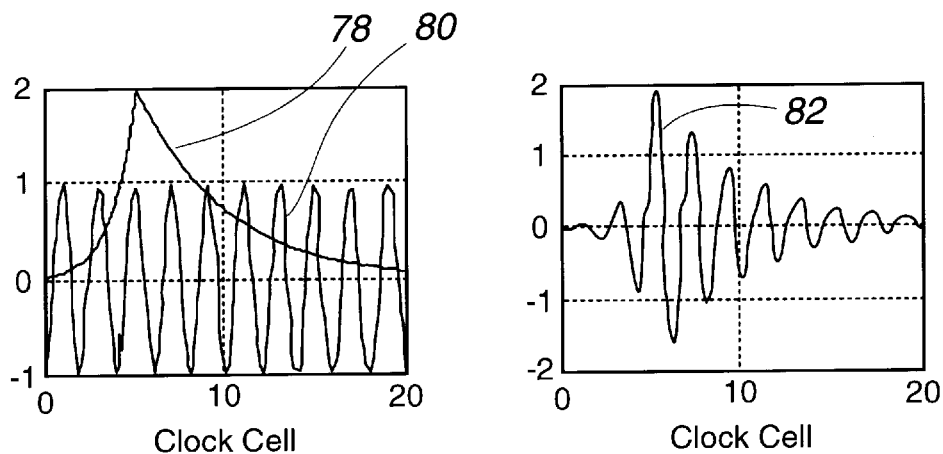
Fig. 9a  Fig. 9b
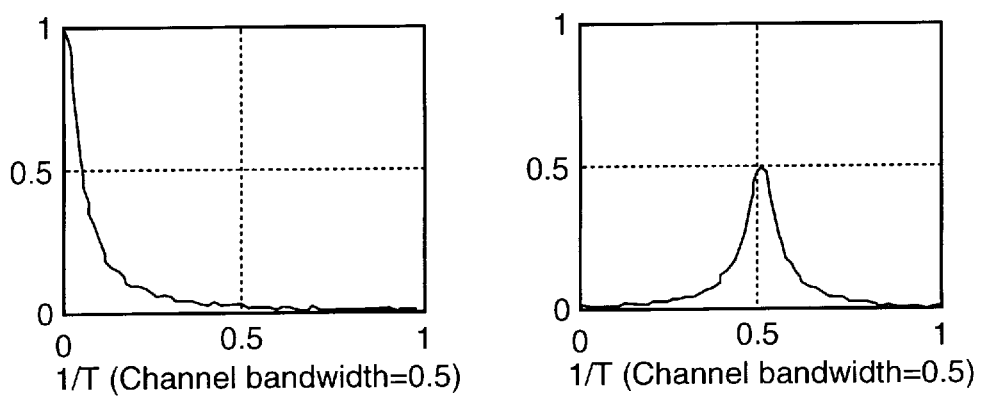
Fig. 9c  Fig. 9d

DATA STORAGE SYSTEM WITH IMPROVED BIASING TECHNIQUES FOR MAGNETO-RESISTIVE ELEMENT

CROSS-REFERENCE TO RELATED APPLICATIONS

This application is a continuation of U.S. application Ser. No. 09/016,551, filed Jan. 30, 1998 U.S. Pat. No. 6,104,563.

FIELD OF THE INVENTION

The present invention relates to magnetic storage devices and, more particulary, to magnetic storage devices which employ magneto-resistive (MR) transducer heads.

BACKGROUND OF THE INVENTION

Disk drives are one type of magnetic storage device that employ MR heads. Digital information is stored within concentric tracks on a storage disk which is coated with a magnetic material that is capable of changing its magnetic orientation in response to an applied magnetic field.

During operation of a conventional disk drive, the disk is rotated about a central axis at a substantially constant rate. To read data from or write data onto the disk, a magnetic transducer is placed above a desired track of the disk while the disk is spinning. Writing is performed by delivering a write signal having a variable current to the transducer while the transducer is held close to the desired track. The write signal creates a variable magnetic field at a gap portion of the transducer that induces magnetic polarity transitions into the desired track which constitute the data being stored.

Reading is performed by sense the magnetic polarity transitions on the rotating track with the transducer. As the disk spins below the transducer, the magnetic polarity transitions on the track present a varying magnetic field to the transducer. The transducer converts the varying magnetic field into an analog read signal that is then delivered to a read channel for appropriate processing. The read channel converts the analog read signal into a properly timed digital signal that can be recognized by a host computer system.

The transducer can include a single element, such as an inductive read/write element for use in both reading and writing, or it can include separate read and write elements. Transducers that include separate elements for reading and writing are known as "dual element heads" and usual include a magneto-resistive (MR) read element for performing the read function.

Dual element heads are advantageous because each element of the transducer can be optimized to perform its particular function. For example, MR read elements are more sensitive to small variable magnetic fields than are inductive heads and, thus, can read much fainter signals from the disk surface. Because MR elements are more sensitive, data can be more densely packed on the surface with no loss of read performance.

MR read elements generally include a strip of magneto-resistive material that is held between two magnetic shields. The resistance of the magneto-resistive material varies almost linearly with the applied magnetic field. During a read operation, the MR strip is held near a desired trade, with the varying magnetic field caused by the magnetic transitions on the track. A constant DC current is passed through the strip resulting in a variable voltage across the strip. By Ohm's law (i.e., V=IR), the variable voltage is proportional to the varying resistance of the MR strip and, hence, is representative of the data stored within the desired track. The variable voltage signal (which is the analog read signal) is then processed and converted to digital form for use by the host.

There are many variables that can adversly affect the read performance of a magnetic disk drive. Of the variables, those which cause temperature variations in the MR element are particularly troublesome. More specifically, because MR elements are positive temperature coefficient devices, increases in the temperature of MR elements cause an increase in the resistance of the MR elements. Since the read signal (in volts) is proportional to the variations in resistance of the MR element multiplied by the bias current and since the bias current is a constant DC current, whenever the temperature of the MR element is increased, a thermal signal is generated which adds to the value of the read signal.

One of the variables which generates thermal signals results from the presence of foreign particles or other aberrations on the surface of the disk. These foreign particles and aberrations are known as asperities. Collisions between the asperities and the transducer cause the transducer to heat up. The increase in temperature resulting from the collisions between the asperities and the transducer causes an increase in the resistance of the MR element. Since the bias current is constant, the resulting voltage appears to be greater than the voltage that should be present based upon the data stored on the magnetic disk. The additive signal resting from the increase in temperature of the MR element is known its a thermal asperity.

Another variable which generates thermal signals results from the variations in the gap between the transducer and the disk due to the disk's surface variations. The head, because a constant current passes through it, is heated to a temperature above the ambient temperature (for example, 20° above ambient temperature). The disk, because it has a temperature essentially equal to the ambient temperature, operates as a heat sink to take heat away from the head. When the gap varies (i.e., it is either greater than or less than a preset value) due to the surface variations of the disk, the head is either cooled or heated which causes variations in its resistance. Such variations are picked up by the read signal and are conventionally known as baseline modulation More specifically, for example, if a protrusion exists on the disk and causes the gap between the disk and the MR element to decrease, the disk operates as a better heat sink at that point on the disk which causes the temperature of the MR element to rapidly decrease. Because the MR element is a positive temperature coefficient device, as the temperature of the MR element decreases, the resistance of the MR element likewise decreases. Similarly, if a valley exists in the disk such that the gap between the disk and the MR element increases, the disk operates as a worse heat sink at that point on the disk which causes the temperature of the MR element to rapidly increase. Because the MR element is a positive temperature coefficient device, as the temperature of the MR element increases, the resistance of the MR element likewise increases. Accordingly, the MR element essentially becomes a microscope which maps the roughness of the disk.

The presence of thermal signals associated with thermal asperities and with baseline modulation can cause unwanted increases in bit error rates. In some instances, the increases in bit error rates are so great that they cause a severe data loss.

Because both magnetic data signals and thermal signals cause variations in the resistance of the MR element, in conventional systems, there is no clear-cut way to separate the desired magnetic data signals from the undesired thermal signals in the read signal. Accordingly, there is a need to develop a method and apparatus capable of distinguishing the desired magnetic signals from the undesired thermal signals so that the thermal signals (such as those associated with thermal asperities and/or baseline modulation) can be minimized or eliminated. The present invention is designed to overcome the aforementioned problems and meet the aforementioned, and other, needs.

SUMMARY OF THE INVENTION

It is an sect of the present invention to minimize or eliminate thermal signals, such as those associated with thermal asperities and/or baseline modulation.

In accordance with the invention, a magnetic storage system capable of separating thermal signals from data signals is disclosed. In one embodiment, the magnetic storage system includes a magnetic media and a head associated with the magnetic media. The head includes a magneto-resistive element which is biased by a modulated bias current. The modulated bias current modulates thermal signals to a first frequency and modulates data signals to at least a second frequency.

A method of separating thermal signals from data signals read from a magnetic storage media is also disclosed. The method includes the steps of: (1) providing a head for reading information from the magnetic storage media, the head having an MR element; and, (2) biasing the MR element with a modulated bias current.

Other objects, features and advantages of the invention will be apparent from the following specification taken in conjunction with the following drawings.

BRIEF DESCRIPTION OF THE DRAWINGS

FIG. 7b illustrates a waveform of an isolated transition pulse for an MR head biased by the AC bias current waveform of FIG. 7a;

FIG. 8a illustrates an AC bias current waveform and a thermal asperity waveform corresponding to an MR head biased by a DC current;

FIG. 8b illustrates a asperity waveform for an MR head which is biased by the AC bias current waveform of FIG. 8a;

FIG. 8c illustrates the frequency response of the thermal asperity waveform of FIG. 8a;

FIG. 8d illustrates the frequency response of the thermal asperity waveform of FIG. 8b;

FIG. 9a illustrates an AC bias current waveform having a frequency equal to $f_c/2$ and a thermal asperity waveform corresponding to an MR head biased by a DC current;

FIG. 9b illustrates a thermal asperity waveform for an MR head which is biased by the AC bias current waveform of FIG. 9a;

FIG. 9c illustrates the frequency response of the thermal asperity waveform of FIG. 9a; and, FIG. 9d illustrates the frequency response of the thermal asperity waveform of FIG. 9b.

DETAILED DESCRIPTION OF THE PREFERRED EMBODIMENT

Figure 1:
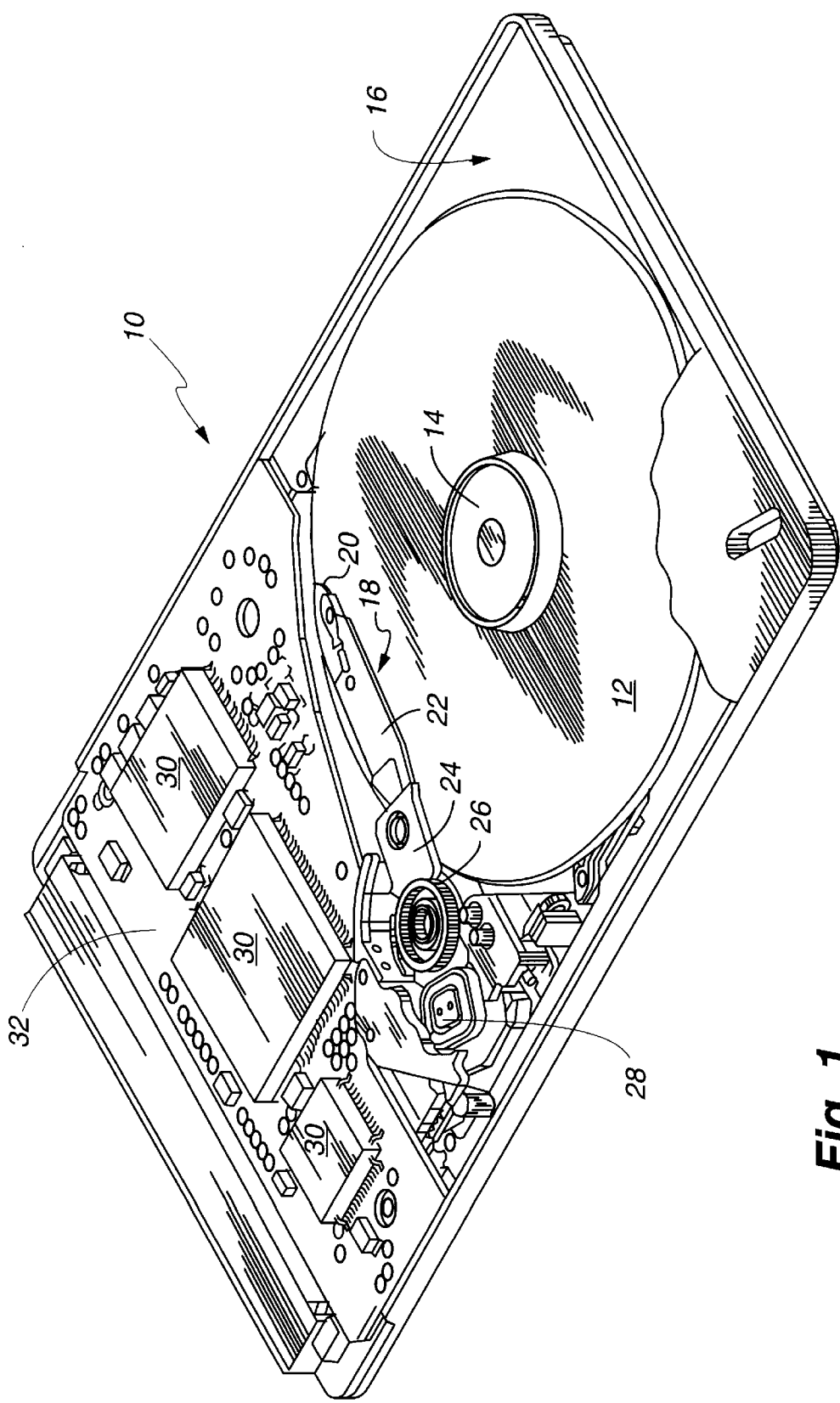
FIG. 1 is a perspective view of a disk drive.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

A disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a head 20 (or transducer) mounted to a flexure arm 22 which is attached to an actuator arm 24 that can rotate about a bearing assembly 26. The actuator arm assembly 18 also contains a voice coil motor 28 which moves the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device.

It should be understood that the disk drive 10 may include a plurality of disks 12 and, therefore, a plurality of corresponding actuator arm assemblies 18. It should also be understood that the principles described below are equally applicable to such disk drives.

The present invention requires an MR read element which is used to read information from a magnetic storage media. In the embodiment shown in FIG. 1, the head 20 includes an MR read element which is used to read information from the magnetic disk 12. Accordingly, a head containing an MR read element is hereinafter referred to as an MR head.

Although the present invention is described in connection with a disk drive system, it should be understood that the principles of the present invention are not limited to disk drives. Rather, the principles of the present invention are equally applicable to all devices employing MR heads used for reading information from magnetic storage media.

As mentioned in the background of invention section above, thermal signals associated with thermal asperities and baseline modulation can cause degradations in the read signal, including increases in bit error rates. Such increases, in extreme cases, can cause a severe data loss. Accordingly, it is desirable to minimize or eliminate such thermal signals.

It has been determined by the inventors of the present invention that by using a modulated bias current (i.e., an AC bias current) rather than a DC bias current to bias the MR element of the head 20, one can sufficiently distinguish the unwanted thermal signals, T(t), from the desired magnetic signals, m(t). Having distinguished the two signals, it is also possible to filter out a portion or all of the thermal signals.

More specifically, by using a modulated bias current having a frequency equal to $f_o$, the thermal signals will have a shifted spectral content which is centered about $f_o$, while the spectral content of the magnetic signals will be centered about both DC and $2f_o$. By using an appropriate filter (such as one which filters-out signals having a frequency greater than just less than $f_o$) the thermal signals at $f_o$ and the component of the magnetic signal at $2f_o$ will either be minimized or, preferably, eliminated. Accordingly, the resultant output will be a filtered signal having a desired magnetic signal centered about DC.

To appreciate the invention, one must properly understand the differing behavior of magnetic signals as compared to the signals when a modulated bias current is used to bias the MR head 20. In this endeavor, the behavior of magnetic signals will be discussed followed by a discussion of the behavior of thermal signals.

Figure 2A:
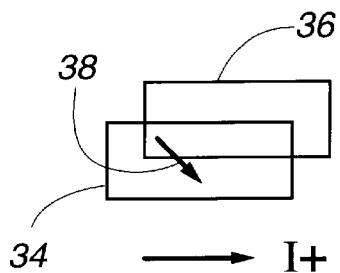
FIGS. 2a and 2b illustrate the relative orientation of the magnetizations of an MR element and soft adjacent layer (SAL) under both positive and negative current (I) conditions, respectively.
Figure 2B:
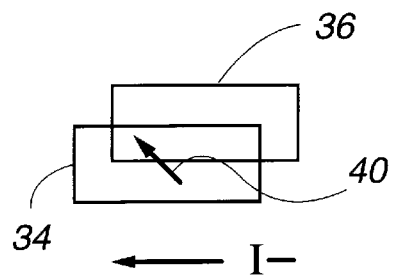

FIGS. 2a and 2b illustrate the relative orientation of the magnetizations of an MR element 34 and its associated soft adjacent layer (SAL) 36 under both positive and negative current (I) conditions. As will be shown below, regardless of the current direction (either positive or negative), the readback signal (in volts) will be positive when a positive external field is applied and will be negative when a negative external field is applied.

Before making specific reference to FIGS. 2a and 2b, certain properties of MR elements must be reviewed and certain conventions must be adopted. As will be understood by those skilled in the art, the resistance of an anisotropic MR element is greatest when its magnetization direction is parallel to the current direction. On the other hand, the resistance of an anisotropic MR element is smallest when its magnetization direction is perpendicular to the current direction. For purposes of FIGS. 2a and 2b, an applied magnetic field, $H_a$, is defined as being positive when pointing towards the top of the page and is defined as being negative when pointing towards the bottom of the page. Additionally, a positive current direction will be indicated by an arrow pointing towards the right side of the page (see FIG. 2a), while a negative current direction will be indicated by an arrow pointing towards the left side of the page (see FIG. 2b).

Referring now to FIGS. 2a and 2b, as will be understood by those skilled in the art, a SAL 36 is provided to generate enough of a magnetic field so that the MR element 34 has a magnetization direction which is at about 45 degrees from horizontal when no external field is applied. In the case of FIG. 2a, the magnetization direction of the MR element 34 is directed towards the bottom right corner of the page about 45 degrees from horizontal (as indicated by arrow 38). Similarly, in FIG. 2b, the magnetization direction is towards the upper left corner of the page about 45 degrees from horizontal (as indicated by arrow 40). As is well-known in the art, the purpose of biasing the MR element 34 so that its magnetization direction sits at about 45 degrees from horizontal is to place the MR element 34 in its linear range.

As mentioned above, FIG. 2a shows the magnetization directions of the MR element 34 and SAL 36 when the modulated bias current is positive. Upon application of a positive external magnetic field, $H_a$ (defined as being directed towards the top of the page), the magnetization direction (indicated by arrow 38) of the MR element 34 tends to become a bit more horizontal because the magnetization wants to follow the applied field. Accordingly, because the magnetization direction becomes more parallel to the direction of the current, the resistance of the MR element 34 increases. Since the readback signal (in volts) is related to the current (which is positive) multiplied by the change in resistance (which is also positive), the readback signal has a positive sign.

FIG. 2b shows the magnetization directions of the MR element 34 and the SAL 36 when the modulated bias current is negative. In such case, the magnetization directions of the MR element 34 and the SAL 36 reverse (turn 180 degrees) as compared to tie magnetization directions of the MR element 34 and SAL 36 shown in FIG. 2a. Thus, when a positive external field is applied to the configuration shown in FIG. 2b, the magnetization direction of the MR element 34 (which seeks to follow the magnetization direction of the applied field) tends to become more perpendicular to the direction of the current. Accordingly, the resistance of the MR element decreases. As explained above, since the readback signal is related to the current (which is negative) multiplied by the change in resistance (which is also negative), the readback signal has a positive sign.

Returning now to FIG. 2a (positive current situation), when a negative external field is applied (defined as pointing towards the bottom of the page), the magnetization direction of the MR element 34 tends to become more perpendicular to the direction of the current. Hence, the resistance of the MR element 34 decreases. Accordingly, the sign of the readback signal will be negative.

Likewise, with reference to FIG. 2b (negative current situation), when a negative external field is applied, the magnetization direction of the MR element 34 tends to become more parallel to the direction of the current. Hence, the resistance of the MR element 34 increases. Therefore, the sign of the readback signal will be negative.

From viewing FIGS. 2a and 2b, one notes that, when the applied magnetic field is positive, the readback signal will be positive regardless of the current direction. Similarly, when the applied magnetic field is negative, the readback signal will be negative regardless of the current direction.

In contrast, in the case of thermal signals, the sign of the thermal signal follows the sign of the current, I. For example, when the head 20 contacts an asperity, the MR element 34 is heated and, therefore, its resistance increases. Since the sign of the thermal signal is equal to the current multiplied by the change in resistance and since the change in resistance is positive, the sign of the thermal signal will be positive when the sign of the current is positive and the sign of the thermal signal will be negative when the sign of the current is negative. The resultant affect is that the thermal signals are modulated to the frequency of the current, I.

Before proceeding it must be noted that the invention is limited to MR heads having absolute sensitivities which do not change with respect to the current direction (i.e., the MR heads are symmetric during a current inversion). Accordingly, as will be understood by those skilled in the art, in order for the head to be symmetric under a current reversal, its magnetic easy axis needs to be parallel to the track width direction. In addition, as will be understood from the discussion above, the invention also requires the sign of the sensitivity of the resistance of the head to change as the current direction is reversed.

As mentioned above, the resultant affect of biasing the MR element with a modulated current is that the thermal signals will be modulated to the frequency of the bias current, $f_o$. The following will assist in understanding why the magnetic signal has components at both DC and $2f_o$.

As is well-known and has been mentioned above, the readback signal is proportional to the resistance change multiplied by the current. A modulated (or AC) bias current could, for example, be:

$$I=\sqrt{2}I_o\sin(2\pi t/T)$$

where T is the data clock cycle and $I_o$ is the amplitude of the bias current if constant DC bias were used. As will be understood by those skilled in the art, the $\sqrt{2}$ factor is needed to ensure that a constant power dissipation exists between the DC bias current and AC bias current situations. More specifically, since (1) power can generally be described by the equation $P=I^2R$, (2) the resistance has not changed, (3) I and $I_o$ are related by the above equation and (4) the average value of $\sin^2 x$ is one-half, the $\sqrt{2}$ factor is needed to make $I^2$ equal to $I_o^2$.

As explained above, the change in resistance, having a sign which changes with respect to the direction of the current, can be described as:

$$\delta R = m(t)\sin(2\pi t/T)$$

Accordingly, the voltage can be described as follows:

$$V=\sqrt{2}I_o m(t)\sin^2(2\pi t/T)$$

Since $\sin^2(2\pi t/T)=1-\cos^2(2\pi t/T)=(½)(1-\cos(2(2\pi t/T)))$, the readback signal can be expressed as:

$$V = \left(\frac{\sqrt{2}}{2}\right)I_o m(t)\left(1 - \cos\left(2\left(\frac{2\pi t}{T}\right)\right)\right)$$

Because $2\pi t/T$ equals $f_o$, the voltage has a component of the external magnetic field, m(t), at DC and at $2f_o$. The DC component of the voltage is fed to the data channel while the component at $2f_o$ is filtered out with the thermal signal (as described below).

While the $2f_o$ component is not used in the preferred embodiment, it is conceivable that such component may be used in distinguishing the thermal signal from the magnetic signal. In such case, the remaining signal at $2f_o$ would have to be demodulated to obtain the magnetic signal. However, the beauty of using the DC component of the voltage signal, as in the preferred embodiment, is that the DC component does not have to be demodulated to obtain the data (magnetic signal).

As set forth above, once the readback signal has been "separated" into its magnetic signal component (at DC and $2f_o$) and the thermal signal component (at $f_o$), both the thermal signal component at $f_o$ and the magnetic signal component at $2f_o$ must be filtered from the magnetic signal component at DC to obtain a filtered voltage signal containing usable data. The filtering is performed by the existing channel filters. Most channels have a set of analog filters followed by a finite impulse response (FIR) filter. As will be understood by those skilled in the art, conventional channel filters (such as those associated with a PR-IV channel) are designed to filter-out all frequencies of the voltage signal which are greater than $f_o/2$. Accordingly, an additional filter is not required in connection with the preferred biasing scheme.

It must be noted, however, that if channel filters do change in the future such that they filter-out frequencies at greater than or less than $f_o/2$, appropriate filtering schemes may be used with the present invention.

Figure 3:
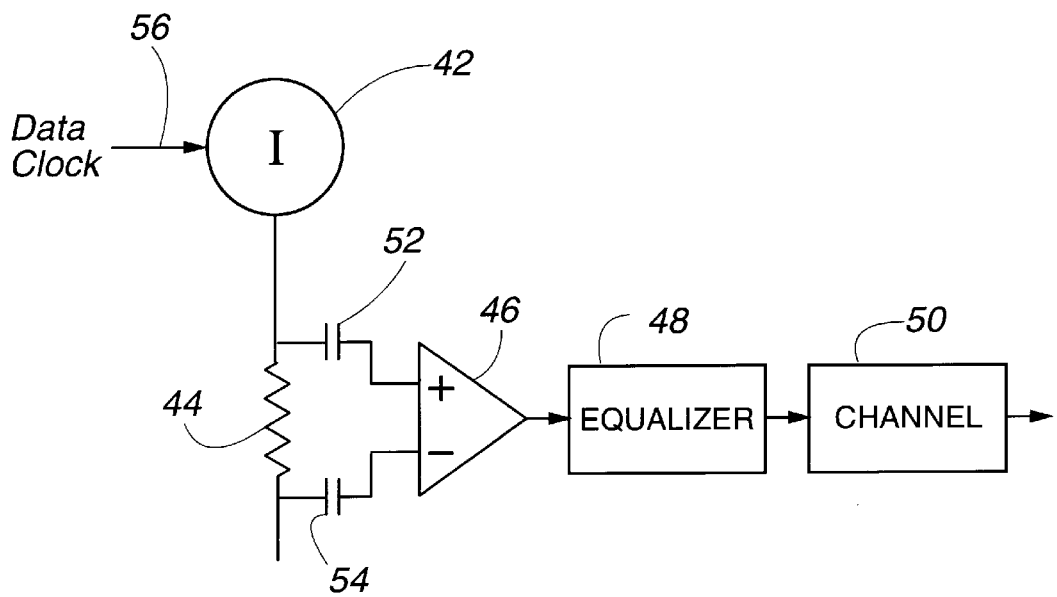
FIG. 3 is a block diagram of a modulated read circuit designed in accordance with the present invention.

FIG. 3 is a block diagram of a bias modulated read circuit designed in accordance with the present invention. The read circuit includes a modulated current source 42, an MR element 44 (equivalent to MR element 34), a differential amplifier 46, an equalizer 48 and a channel 50. The modulated current source 42 is used to bias the MR element 44.

In FIG. 3, the MR element 44, because it changes its resistance based upon magnetic fields from the disk 12, is represented as a resistor. The voltage across the resistor (i.e., the readback voltage) is related to the change in resistance of the MR element 44 multiplied by the modulated bias current generated by the modulated current source 42.

The differential amplifier 46 takes the voltage difference between its non-inverting and inverting inputs, and multiplies the difference by a constant to provide an output signal. As shown in FIG. 3, a pair of capacitors 52, 54 are included and operate as DC blockers so that only the sinusoidal portion of the readback signal is passed to the differential amplifier 46.

The equalizer 48 receives the output of the differential amplifier 46 and amplifies/attenuates certain portions of the output signal to provide an equalized output signal at its output. The channel 50 receives the equalized output signal and processes it (including demodulating it) for use by a host computer (not shown).

As shown in FIG. 3, the modulated current source 42 has a data clock input 56 which is used to synchronize the frequency of the current source to the frequency of the data clock. The manner of synchronization of the modulated frequency with the data clock will be understood by those skilled in the art. However, for clarity, the manner of synchronization will be described in connection with FIG. 5 below.

The resultant effect of biasing the MR head with a modulated bias current is that data signals may be separated from thermal noise. Accordingly, the unwanted thermal noise may be filtered from the desired data signals so that bit error rates may be minimized.

Figure 4:
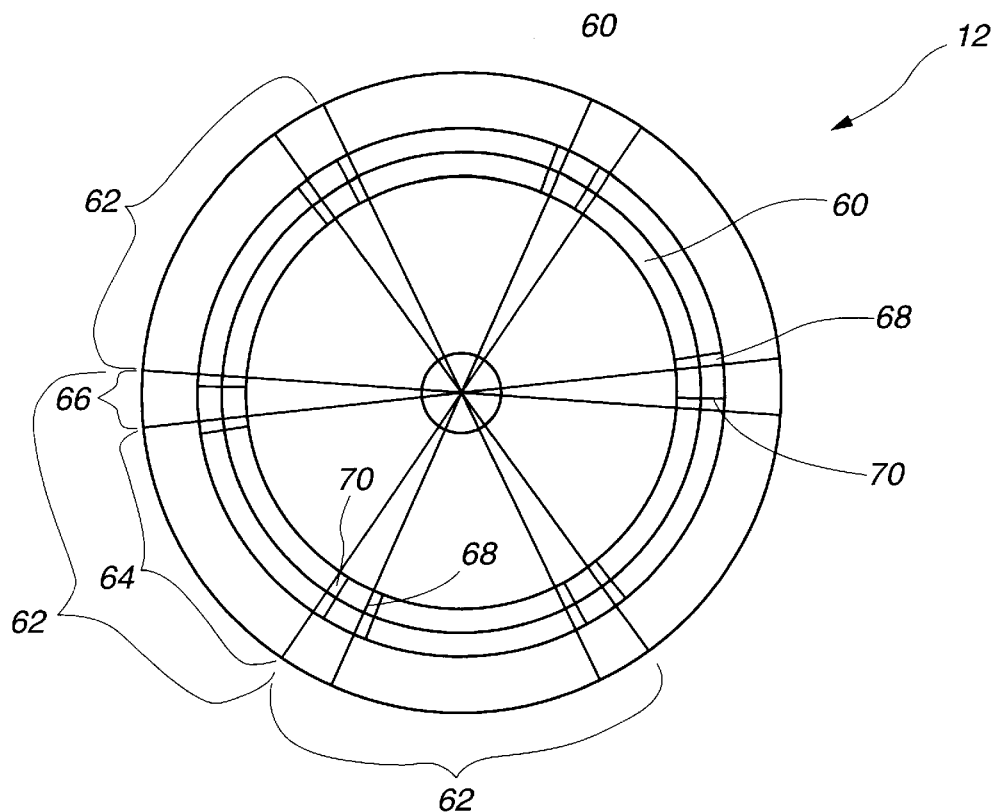
FIG. 4 is a diagrammatic representation of a magnetic disk which illustrates some of the information stored thereon.

In order to explain how the frequency of the bias current is synchronized with the data clock, some background is required. Hence, reference is now made to FIG. 4 which illustrates some of the information stored on a magnetic disk. The magnetic disk 12 is divided into a plurality of concentric tracks 60. Each track 60 is further divided into sectors 62. The sectors 62 may be divided into a data region 64 and a servo region 66. A synchronization field 68 may be provided at the beginning of each data region 64 of a sector 62. Similarly, an automatic gain control ("AGC") field 70 may be provided at the beginning of each servo region 66 of a sector 62. The synchronization field 68 and the AGC field 70 each contain a fixed frequency pattern indicative of the "data rate" for their corresponding data region 64 and servo region 66, respectively. More specifically, the fixed frequency pattern is typically written at half the maximum "data rate."

Figure 5:
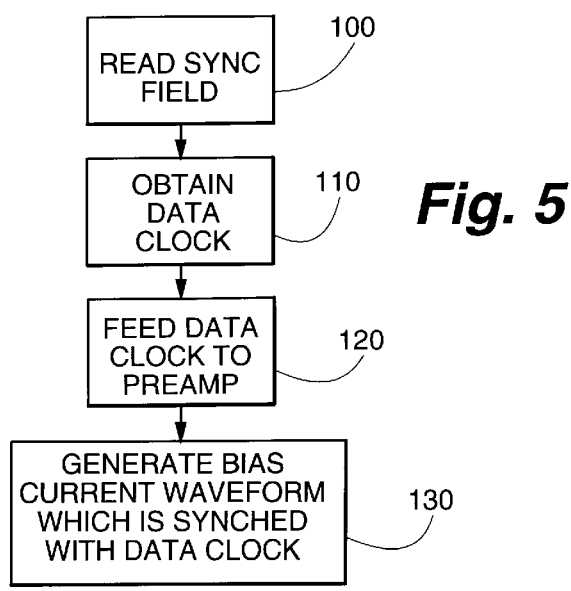
FIG. 5 is a block diagram which illustrates the manner by which the frequency of the bias current is synchronized with the data clock.

With this background, reference is now made to FIG. 5 which illustrates the manner in which the bias current is synchronized with the data clock. First, in step 100, the head reads from the synchronization field corresponding to the data portion of the sector from which data is to be read. When reading from the synchronization field, a DC bias current is used. In step 110, the data clock or data rate is obtained from reading the synchronization field. In step 120, the data clock is fed to a preamplifier for appropriate amplification/attenuation prior to delivery to the current source. Finally, in step 130, the output of the preamplifier is delivered to the current source to generate a bias current which is synchronized with the data clock.

In a preferred embodiment, a DC bias current is used in connection with reading servo information from the servo region of the track, while a modulated bias current is used in connection with reading data from the data region of the track. As will be understood by those skilled in the art, this is because the lion's share of the disk is occupied by data rather than servo information. Hence, there is a greater likelihood of encountering thermal noise in a data region as opposed to a servo region of the disk.

It should be noted, however, that an AC bias current may be used for both reading servo information and data. In such case, in step 100 of FIG. 5, the AGC field 70 would be read for its corresponding servo region 66 to obtain the data clock for that servo region. The remaining steps in FIG. 5 would then be followed.

In another embodiment of the invention, a DC bias current may be used at all times other than during error recovery, at which time a modulated bias current may be used. As is known in the art, some conventional disk drive channels can detect the presence of certain thermal signals (such as thermal asperities) due to their difference in time behavior as compared to a magnetic signal. Accordingly, when a thermal asperity is detected and causes problems, the disk drive system would enter error recovery mode and switch from a DC bias current to a modulated bias current. The disk drive system would then perform a second read in error recovery mode.

Figure 6:
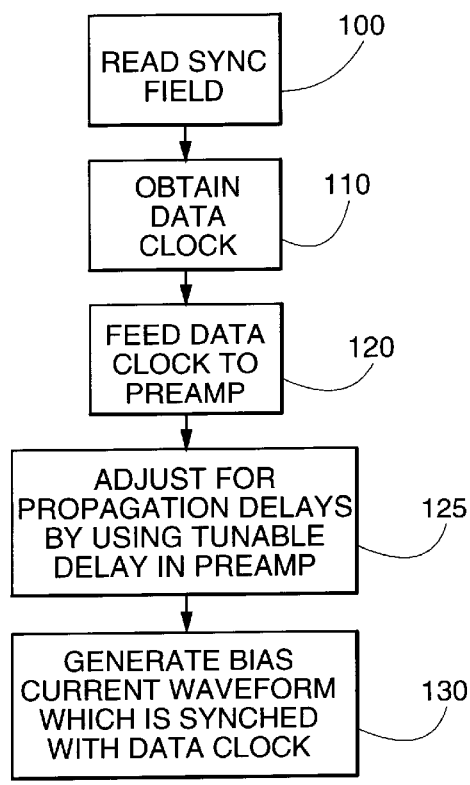
FIG. 6 is a block diagram similar to that of FIG. 5, except that it includes a tunable delay.

In certain instances (for example, at high data rates), propagation (or transmission) delays exist between the clock signal and the bias current waveform that appears on the MR head. FIG. 6 shows another manner by which the frequency of the bias current may be synchronized with the data clock. Specifically, the embodiment shown in FIG. 6 compensates for the aforementioned propagation delays. The embodiment of FIG. 6 is similar to that of FIG. 5 except that the preamplifier includes a tunable delay (step 125) to reduce the propagation delays between the clock signal and the bias current waveform. The inclusion of the tunable delay allows for the optimal synchronization of the bias current waveform to the data clock, and therefore, to the data in the data region (or servo region).

Figure 7A:
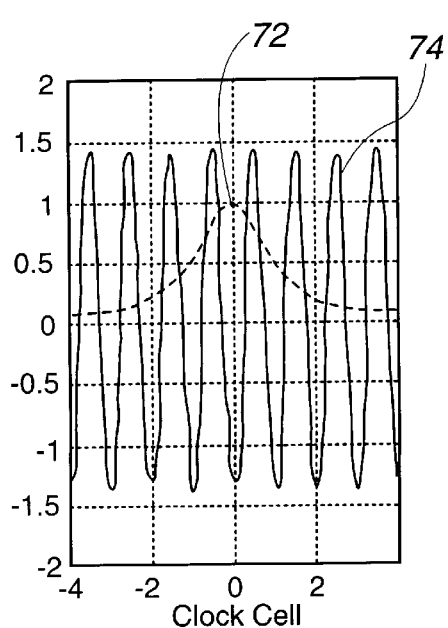
FIG. 7a illustrates an AC bias current waveform in solid lines and a waveform of an isolated transition pulse having an MR head biased by a DC current in dashed lines.
Figure 7B:
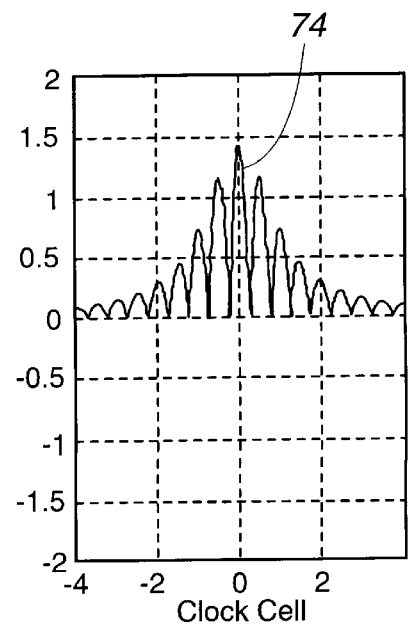

To illustrate the present invention at the signal level, reference is now made to FIGS. 7a and 7b. Specifically, FIG. 7a shows an isolated transition pulse 72 for an MR head having a DC bias current, where the x-axis is in units of clock cells and the y-axis is in units of volts. FIG. 7a also shows an AC bias current waveform 74.

FIG. 7b illustrates an isolated transition pulse 76 for an MR head which is biased by an AC bias current, where the x-axis is in units of clock cells and the y-axis is in units of volts. As will be understood by the explanations given above, the pulse 76 shown in FIG. 7b has a component centered about DC and a frequency-shifted component centered at $2f_o$, which is eliminated by a low pass filter that filters frequencies greater than approximately $f_o/2$.

FIGS. 8a–8d are provided to illustrate the manner in which thermal asperities and baseline modulation are eliminated by way of modulating the bias current and then filtering. FIG. 8a illustrates a thermal asperity waveform 78 corresponding to an MR head biased by a DC currrent, where the x-axis is in clock cells and the y-axis is in volts. FIG. 8a also shows an AC bias current waveform 80. FIG. 8b illustrates a thermal asperity waveform 82 resulting from an MR head which is biased by the AC bias current waveform 80.

FIGS. 8c and 8d, respectively, show the frequency responses of the thermal asperity waveforms shown in FIGS. 8a and 8b, where the x-axis is in units of frequency ($f_o$) and the y-axis is in units of volts. Since the energy of the thermal asperity has been shifted to a narrow band around $f_o$ through use of the modulated bias current waveform 80 (as shown in FIG. 8d), it can be removed by use of a low pass filter having a cut-off frequency near $f_o/2$.

As will be apparent to those skilled in the art, a baseline modulation waveform will be similar to the thermal asperity waveform 78 (FIG. 8a). More specifically, when the gap between the head and the disk is greater than a preset value, due a valley in the disk's surface, the MR element will be heated and the baseline modulation waveform will be similar in shape to the thermal asperity waveform 78. However, when the gap is less than the preset value, due to a protrusion above the disk's surface, the baseline modulation waveform will be similar in shape to the thermal asperity waveform 78 but inverted with respect to the x-axes.

Finally, in certain instances it may be possible to modulate the current at a frequency equal to $f_o/2$ instead of $f_o$. Specifically, the current may be modulated at $f_o/2$ when (1) the thermal signal is limited to a low bandwidth and (2) the scheme requires less equalization, such as when an EPR-IV (extended partial response four) channel is used. In such case, the thermal signals are shifted to a narrow band around $f_o/2$ and are largely eliminated by the equilizer prior to sampling, as will be understood by those skilled in the art. FIGS. 9a–9d illustrate the waveforms when the modulation frequency is $f_o/2$. A comparison of FIGS. 5a–9d with corresponding FIGS. 8a–8d may amplify the differences between modulating with a frequency of $f_o2$ instead of $f_o$.

It will be understood that the invention may be embodied in other specific forms without departing from the spirit or central characteristics thereof. The present examples and embodiments, therefore are to be considered in all respects as illustrative and not restrictive, and the invention is not intended to be limited to the details given herein.

What is claimed is:

1. A data storage system, comprising:
    a magnetic storage media; and
    a magneto-resistive element that reads information stored on the magnetic storage media, wherein the magneto-resistive element receives a modulated bias current with a modulation frequency that is synchronized to a data clock responsive to a data pattern stored on the magnetic storage media.

2. The system of claim 1, wherein the data pattern is a fixed frequency pattern.

3. The system of claim 1, wherein the magneto-resistive element receives a DC bias current as the magneto-resistive element reads the data pattern.

4. The system of claim 1, wherein the magnetic storage media includes a data region, the data region includes a synchronization field and a data field, the synchronization field includes the data pattern, the data field includes user data, and the magneto-resistive element receives the modulated bias current as the magneto-resistive element reads the user data.

5. The system of claim 1, wherein the magnetic storage media includes a servo region, the servo region includes an automatic gain control field and a servo burst field, the automatic gain control field includes the data pattern, the servo burst field includes servo bursts, and the magneto-resistive element receives the modulated bias current as the magneto-resistive element reads the servo bursts.

6. The system of claim 1, wherein the magnetic storage media includes a servo region and a data region, the magneto-resistive element receives a DC bias current as the magneto-resistive element reads information from the servo region, and the magneto-resistive element receives the modulated bias current as the magneto-resistive element reads information from the data region.

7. The system of claim 1, wherein the magneto-resistive element receives the modulated bias current during an error recovery operation in response to a failed read operation, and the magneto-resistive element receives a DC bias current during normal read operations.

8. The system of claim 1, wherein the modulation frequency is equal to a frequency of the data clock.

9. The system of claim 1, wherein the modulation frequency is one-half a frequency of the data clock.

10. The system of claim 1, wherein a tunable preamplifier provides a tunable delay to reduce propagation delays between the data clock and the modulated bias current.

11. The system of claim 1, wherein the modulated bias current has a sinusoidal waveform.

12. The system of claim 1, wherein the magneto-resistive element provides data signals and thermal signals as the magneto-resistive element receives the modulated bias current, the thermal signals are modulated at the modulation frequency, and a low pass filter filters the thermal signals modulated at the modulation frequency.

13. The system of claim 12, wherein the data signals include a first component centered around DC and a second component centered around twice the modulation frequency.

14. The system of claim 13, wherein the low pass filter filters the first component of the data signals without filtering the second component of the data signals.

15. The system of claim 13, wherein the low pass filter filters the second component of the data signals without filtering the first component of the data signals.

16. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, and the modulation frequency exceeds a frequency at which the magneto-resistive element encounters servo bursts on the magnetic storage media.

17. The system of claim 16, wherein the data pattern is a fixed frequency pattern.

18. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, and the magneto-resistive element receives a DC bias current as the magneto-resistive element reads the data pattern.

19. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, the magnetic storage media includes a data region, the data region includes a synchronization field and a data field, the synchronization field includes the data pattern, the data field includes user data, and the magneto-resistive element receives the modulated bias current as the magneto-resistive element reads the user data.

20. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, and the magnetic storage media includes a servo region, the servo region includes an automatic gain control field and a servo burst field, the automatic gain control field includes the data pattern, the servo burst field includes servo bursts, and the magneto-resistive element receives the modulated bias current as the magneto-resistive element reads the servo bursts.

21. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, and the magnetic storage media includes a servo region and a data region, the magneto-resistive element receives a DC bias current as the magneto-resistive element reads information from the servo region, and the magneto-resistive element receives the modulated bias current as the magneto-resistive element reads information from the data region.

22. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, and the magneto-resistive element receives the modulated bias current during an error recovery operation in response to a failed read operation, and the magneto-resistive element receives a DC bias current during normal read operations.

23. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, and the modulation frequency is equal to a frequency of the data pattern.

24. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, and the modulation frequency is one-half a frequency of the data pattern.

25. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, and a tunable preamplifier provides a tunable delay to reduce propagation delays between the data pattern and the modulated bias current.

26. The system of claim 16, wherein the modulated bias current has a sinusoidal waveform.

27. A data storage system, comprising:

a magnetic storage media; and a magneto-resistive element that reads information stored on the magnetic storage media, wherein the magneto-resistive element receives a modulated bias current with a modulation frequency that is synchronized to a data pattern stored on the magnetic storage media, and the magneto-resistive element provides data signals and thermal signals as the magneto-resistive element receives the modulated bias current, the thermal signals are modulated at the modulation frequency, and a low pass filter filters the thermal signals modulated at the modulation frequency.

28. The system of claim 27, wherein the data signals include a first component centered around DC and a second component centered around twice the modulation frequency.

29. The system of claim 28, wherein the low pass filter filters the first component of the data signals without filtering the second component of the data signals.

30. The system of claim 28, wherein the low pass filter filters the second component of the data signals without filtering the first component of the data signals.

31. A data storage system, comprising:

a magnetic storage media;

a magneto-resistive element that reads information stored on the magnetic storage media; and a bias circuit that provides a modulated bias current to the magneto-resistive element, wherein the modulated bias current has a modulation frequency that is synchronized to a data clock obtained from the magneto-resistive element reading a data pattern stored on the magnetic storage media.

32. A data storage system, comprising:

a magnetic storage media;

a magneto-resistive element that reads information stored on the magnetic storage media; and a bias circuit that provides a modulated bias signal to the magneto-resistive element in response to and in synchronization with a clock signal provided by the magneto-resistive element.

33. A data storage system, comprising:

a magnetic storage media;

a magneto-resistive element that reads information stored on the magnetic storage media; and a bias circuit that modulates the magneto-resistive element with an AC biasing signal synchronized to a data pattern stored on the magnetic storage media, and a frequency of the AC biasing signal is independent of a frequency at which the magneto-resistive element encounters servo bursts on the magnetic storage media.

34. A data storage system, comprising:

a magnetic storage media;

a magneto-resistive element that reads information stored on the magnetic storage media; and a bias circuit that biases the magneto-resistive element with a time-varying signal having a frequency determined by a data pattern stored on the magnetic storage media, wherein the data pattern includes more than boundaries between adjacent servo bursts on the magnetic storage media.

35. A data storage system, comprising:

a magnetic storage media;

a magneto-resistive element that reads information stored on the magnetic storage media; and a bias circuit that provides a modulated bias current to the magneto-resistive element during a read operation, wherein the modulated bias current has a modulation frequency that is synchronized to a data clock, and a rate of the data clock is based on a fixed frequency pattern stored on the magnetic storage media and read by the magneto-resistive element.

36. A data storage system, comprising:

a magnetic storage media; and a magneto-resistive element that reads information stored on the magnetic storage media, wherein the magneto-resistive element receives a DC bias current as the magneto-resistive element reads a first predetermined region of the magnetic storage media, the magneto-resistive element receives a modulated bias current as the magneto-resistive element reads a second predetermined region of the magnetic storage media, and the modulated bias current has a modulation frequency that is determined by information on the magnetic storage media and that exceeds a frequency at which the magneto-resistive element encounters servo bursts, if any, in the second predetermined region.

37. The system of claim 36, wherein the first predetermined region is one of a servo region and a data region, and the second predetermined region is the other of the servo region and the data region.

38. The system of claim 36, wherein the first predetermined region is a servo region.

39. The system of claim 36, wherein the second predetermined region is a data region.

40. The system of claim 36, wherein the first predetermined region is a servo region and the second predetermined region is a data region.

41. The system of claim 36, wherein the first and second predetermined regions are in a servo region.

42. The system of claim 41, wherein the first predetermined region is an automatic gain control field and the second predetermined region is a servo burst field.

43. The system of claim 36, wherein the first and second predetermined regions are in a data region.

44. A data storage system, comprising:

a magnetic storage media; and a magneto-resistive element that reads information stored on the magnetic storage media, wherein the magneto-resistive element receives a DC bias current as the magneto-resistive element reads a first predetermined region of the magnetic storage media, the magneto-resistive element receives a modulated bias current as the magneto-resistive element reads a second predetermined region of the magnetic storage media, the first and second predetermined regions are in a data region, and the first predetermined region is a synchronization field and the second predetermined region is a user data field.

45. A data storage system, comprising:

a magnetic storage media; and a magneto-resistive element that reads information stored on the magnetic storage media, wherein the magneto-resistive element receives a DC bias current as the magneto-resistive element reads a first predetermined region of the magnetic storage media, the magneto-resistive element receives a modulated bias current as the magneto-resistive element reads a second predetermined region of the magnetic storage media, and the modulated bias current is synchronized to a clock signal obtained from the magneto-resistive element as the magneto-resistive element receives the DC bias current and reads from the first predetermined region.

46. The system of claim 36, wherein the modulated bias current has a sinusoidal waveform.

47. A data storage system, comprising:

a magnetic storage media; and a magneto-resistive element that reads information stored on the magnetic storage media, wherein the magneto-resistive element receives a DC bias current as the magneto-resistive element reads a first predetermined region of the magnetic storage media, the magneto-resistive element receives a modulated bias current as the magneto-resistive element reads a second predetermined region of the magnetic storage media, the magneto-resistive element provides data signals and thermal signals as the magneto-resistive element receives the modulated bias current, the thermal signals are modulated at the modulation frequency, and a low pass filter filters the thermal signals modulated at the modulation frequency.

48. The system of claim 47, wherein the data signals include a first component centered around DC and a second component centered around twice the modulation frequency.

49. The system of claim 48, wherein the low pass filter filters the first component of the data signals without filtering the second component of the data signals.

50. The system of claim 48, wherein the low pass filter filters the second component of the data signals without filtering the first component of the data signals.

51. A data storage system, comprising:

a magnetic storage media;

a magneto-resistive element that reads information stored on the magnetic storage media; and a bias circuit that provides a DC bias current to the magneto-resistive element as the magneto-resistive element reads a first predetermined region of the magnetic storage media and provides a modulated bias current to the magneto-resistive element as the magneto-resistive element reads a second predetermined region of the magnetic storage media, wherein the modulated bias current has a modulation frequency that exceeds twice a frequency at which the magneto-resistive element encounters boundaries between adjacent servo bursts, if any, on the magnetic storage media.

52. A data storage system, comprising:

a magnetic storage media;

a magneto-resistive element that reads information stored on the magnetic storage media; and a bias circuit that provides a DC bias current to the magneto-resistive element as the magneto-resistive element reads a predetermined fixed frequency pattern stored on the magnetic storage media and provides a modulated bias signal to the magneto-resistive element as the magneto-resistive element reads a user data pattern stored on the magnetic storage media during a normal read operation.

53. A data storage system, comprising:

a magnetic storage media;

a magneto-resistive element that reads information stored on the magnetic storage media; and a bias circuit that modulates the magneto-resistive element with a DC biasing signal as the magneto-resistive element reads a first predetermined region of the magnetic storage media and modulates the magneto-resistive element with an AC biasing signal as the magneto-resistive element reads a second predetermined region of the magnetic storage media that is adjacent to and follows the first predetermined region, wherein the AC biasing signal has a modulation frequency that exceeds twice a frequency at which the magneto-resistive element encounters boundaries between adjacent servo bursts, if any, on the magnetic storage media.

54. A data storage system, comprising:

a magnetic storage media;

a magneto-resistive element that reads information stored on the magnetic storage media; and a bias circuit that biases the magneto-resistive element with a DC signal as the magneto-resistive element provides a read signal during a first predetermined portion of a read operation and with a time-varying signal as the magneto-resistive element provides a read signal during a second predetermined portion of the read operation, wherein the time-varying signal has a modulation frequency that exceeds twice a frequency at which the magneto-resistive element encounters boundaries between adjacent servo bursts, if any, on the magnetic storage media.

55. A data storage system, comprising:

a magnetic storage media;

a magneto-resistive element that reads information stored on the magnetic storage media; and a bias circuit that provides a DC bias current to the magneto-resistive head as information other than user data is read during a normal read operation and that subsequently provides a modulated bias current to the magneto-resistive element as user data is read during the read operation.

56. A data storage system, comprising:

a magnetic storage media; and a magneto-resistive element that reads information stored on the magnetic storage media, wherein the magneto-resistive element receives a DC bias current as the magneto-resistive element reads the information during a normal read operation, the magneto-resistive element receives a modulated bias current as the magneto-resistive element reads the information during an error recovery operation, and the modulated bias current has a modulation frequency determined by the information.

57. The system of claim 56, wherein the information is user data.

58. The system of claim 56, wherein the magneto-resistive element receives the DC bias current throughout all of the normal read operation.

59. The system of claim 56, wherein the magneto-resistive element receives the modulated bias current only during the error recovery operation.

60. The system of claim 56, wherein the error recovery operation is responsive to thermal noise detected during the normal read operation.

* * * * *